United States Patent [19]

Davis et al.

[11] 4,197,368
[45] Apr. 8, 1980

[54] LEAD ACID BATTERY PLATE HAVING SODIUM SILICATE AS A DUST PREVENTATIVE

[75] Inventors: Stanley M. Davis, Princeton, N.J.; Ralph E. Thomas, Yardley, Pa.; Philip Bernstein, Glen Ridge, N.J.

[73] Assignee: ESB Technology Company, Yardley, Pa.

[21] Appl. No.: 951,369

[22] Filed: Oct. 16, 1978

[51] Int. Cl.² ............................................. H01M 4/56
[52] U.S. Cl. .................................................... 429/225
[58] Field of Search ................................ 429/225–228

[56] References Cited

U.S. PATENT DOCUMENTS

| 776,192 | 11/1904 | Meygret | 429/212 |
|---|---|---|---|
| 3,496,020 | 2/1970 | Jackson et al. | 429/217 |
| 3,518,120 | 6/1970 | Lallo et al. | 429/225 X |
| 3,716,412 | 2/1973 | Peters | 429/228 X |
| 3,905,829 | 2/1978 | Weissman et al. | 429/233 |
| 4,135,041 | 1/1979 | Jung | 429/225 |

*Primary Examiner*—Charles F. LeFevour
*Attorney, Agent, or Firm*—Gilbert W. Rudman; E. C. MacQueen

[57] ABSTRACT

A lead acid battery plate is disclosed wherein sodium silicate is added to the paste mix before the grids are pasted to reduce the tendency to create lead dust from handling of the plates without significantly reducing battery performance.

7 Claims, No Drawings

LEAD ACID BATTERY PLATE HAVING SODIUM SILICATE AS A DUST PREVENTATIVE

REFERENCE TO RELATED APPLICATION

This application relates to copending application Ser. No. 951,368, filed on even date herewith by the same inventors, entitled, "Lead Acid Battery Plate Having A Sodium Silicate Coating As A Dust Preventative."

BACKGROUND OF THE INVENTION

This invention relates to lead acid battery plate construction having means for reducing the lead dust created during battery assembly, and more specifically to a lead acid battery plate in which the dust preventative is added to the paste mix prior to pasting of the grids.

The standard procedure for manufacturing lead acid storage batteries generally requires the steps of: (1) mixing the positive and negative paste batches; (2) manufacturing the grids; (3) pasting the grids to make plates; (4) drying and curing the plates; (5) forming the plates; (6) stacking the plates with separators for final assembly into a battery container. These steps all require various degrees of transporting and handling which results in contact between the plates themselves and the various pieces of equipment used to assemble batteries. Fine leady particles are thereby produced which emanate into the air to create a pollution problem.

For purposes of improving the quality of the environment for the workers and to meet federal regulations for air standards, changes in the standard procedure for manufacturing batteries are required. Several prior art ideas for meeting this challenge are known. Meygret, U.S. Pat. No. 776,192, discloses the use of tetra-acetate of cellulose to make a film for coating for a lead acid plate. Jackson et al, U.S. Pat. No. 3,496,020 discloses the use of vinyl resins in the paste mix. Lello et al, U.S. Pat. No. 3,518,120, discloses the use of a polymerized resin coating containing an abietic acid dimer. Weissman et al, U.S. Pat. No. 3,905,829, discloses a lead acid battery plate coated with a water soluble coating of a film forming polymeric compound, such as polymerized polyvinyl alcohol or other similar substances.

Despite these various additives and coatings, there still remains today a need for a method to economically reduce the dusting of lead acid battery plates while not affecting the battery performance.

SUMMARY OF THE INVENTION

In accordance with the preferred embodiment, a paste mix additive for lead acid storage battery plates is disclosed which substantially reduces the lead dust created when handling storage battery plates during the battery manufacturing process. The paste mix additive preferably comprises a form of sodium silicate, preferrably anhydrous sodium silicate, which is added to the mix before the battery grids are pasted. The preferred amount of sodium silicate in the paste mix is within the range of 0.1 to 1.0 weight percent.

The specific sodium silicate preferred is one having $SiO_2/Na_2O$ ratio of 3.22 wherein the percent of $SiO_2$ is approximately 75 and the percent of $Na_2O$ is approximately 23.

By using sodium silicate in the paste mix, substantial reduction in dusting has been obtained with virtually no reduction in battery performance, all accomplished in an economically and environmentally safe fashion.

A better understanding of the invention and its advantages can be seen in the following description of the preferred embodiment.

DETAILED DESCRIPTION OF THE PREFERRED EMBODIMENT

During the manufacturing process for lead acid batteries, positive and negative paste mixtures are made for application to a grid. The basic component in the paste is lead oxide (PbO), which is produced by milling lead pigs to enable oxidation of the lead by air. The lead oxide is transformed into a powder which is emptied into a mixer. Other dry additives, such as reinforcing fibers, are added to the mixer. The mixture is then mixed until the additives are fully dispersed. Water is added and the mixing continues to oxidize any free lead not yet oxidized. Other aqueous additives may be added to the mix. Finally, acid is added and thoroughly mixed in the paste mix. Throughout the mixing process the batch temperature is controlled within predetermined limits. The paste mix is tested for density and emptied into a pasting machine for application to the grids.

In accordance with the preferred method of the subject invention, anhydrous sodium silicate is added to the paste mix in an amount sufficient to reduce the tendency of the lead dust to be abraded from the plates. The sodium silicate is preferably anhydrous and added to the dry paste mix along with other dry additives before the addition of water and sulfuric acid. However, an alternate method utilizes sodium silicate in the form of a hydrated powder which is also added to the dry mix, or after the addition of acid. However, tests have shown that the best dispersion results are obtained by the preferred method.

Preferably, the amount of sodium silicate added ranges from approximately 0.10 to 1.0% by weight for both the positive and negative mixes, with a preferred percent of 0.5% by weight.

While several types of sodium silicates can provide comparable results, it has been found that the sodium silicate sold by the Philadelphia Quartz Company, Valley Forge, Pa., under the name "SS 65" has provided the best results. "SS 65", as defined by Philadelphia Quartz specifications, has 74.4% $SiO_2$, 23.1% $Na_2O$, and 0% $H_2O$ with a $SiO_2/Na_2O$ ratio of 3.22.

When comparing plates constructed in accordance with the preferred method to those constructed by conventional methods, it has been found that the dried plates with sodium silicate have fewer cracks in the active material with significantly greater resistance to separation from the grid in response to physical contact.

In an attempt to analytically compare the abrasion resistance of the two types of plates an abrasion test was devised. In this test each plate was first weighed and then subjected to a mechanical abrasion step wherein a nylon brush was mechanically passed across the surface of each plate and returned back to its original position for 20 consecutive back and forth passes. The particular test apparatus used was the Gardner Straight Line Washability and Abrasion Machine manufactured by Gardner Laboratory Incorporated of Bethesda, Maryland. Afterwards, the plate is weighed and the percent of dust lost is calculated. In a typical test using 0.5% "SS 65" sodium silicate in the paste mix, a 50% improvement in lead dust retention over that of conventional plates without sodium silicate (control) was obtained, as can be seen in the table provided below.

SCRUB TEST RESULTS (Uncharged)

|  | SS 65 | CONTROL |
|---|---|---|
| Positive plate average | .06% | 0.12% |
| Negative | .08% | 0.13% |

A similar result is also found on plates formed and dried, as can be seen below in the following table:

SCRUB TEST RESULTS (Dry Charged)

|  | SS 65 | CONTROL |
|---|---|---|
| Positive plate average | 0.09% | 0.17% |
| Negative | 0.18% | 0.23% |

The "0.5%" level of sodium silicate in the paste mix was determined by conducting abrasion tests on plates constructed from paste mixes with different amounts of sodium silicate. The test results from this series of tests are summarized in the following table.

| Percent of "SS 65" Sodium Silicate | Percent Dust Loss In Abrasion Test |
|---|---|
| 0.0 (Control) | 0.10 |
| 0.5 | 0.03 |
| 1.0 | 0.03 |
| 1.5 | 0.03 |
| 2.0 | 0.02 |
| 4.0 | 0.02 |

Further tests were conducted to determine the optimum amount of sodium silicate to be added to the mix by comparing the percentage of sodium silicate to battery performance. Three plate test cells were constructed and container formed to be used for this purpose. A summary of the cell performance related to percentage of "SS-65" sodium silicate in the paste mix is provided in the following table.

THREE PLATE CELL DATA

| Percent of SS 65 Sodium Silicate | Amp hours At 7.5 amps | Percent Capacity of Control |
|---|---|---|
| 0.0 (control) | 12.15 | — |
| 0.5 | 12.03 | 99 |
| 1.0 | 10.81 | 89 |
| 2.0 | 9.96 | 82 |

As a result of these preliminary tests and also economic considerations, it was determined that the optimum amount of sodium silicate was at about 0.5% in each paste mix batch, with a preferred range from 0.1% to 1.0%. Any greater concentrations of sodium silicate reduce the capacity of the battery below an acceptable level, despite the slightly better dust prevention characteristics. However, the data indicates that acceptable dust prevention characteristics are obtained around 0.5% concentration with minimum effect on battery performance, and suggest that acceptable results would probably be obtained at lesser concentrations down to about 0.1% sodium silicate.

The laboratory test results showing sodium silicate reduces lead dust levels were verified in a plant situation where lead in air samples before the use of "SS 65" sodium silicate and after were compared. While these test results have not been based on an extremely large sample, these results do provide a reliable indication that the addition of sodium silicate to the paste mix in the production of lead acid batteries helps produce a significant reduction in the lead dust in the air. The best results occurred in the plate stacking and winkel burning areas of the plant. Improvement was also found in the pasting take-off area. However, results in the paste mixing area were non-conclusive. The following two tables provide a good summary of the results in the stacking and burning areas where the paste having sodium silicate has 0.5% "SS-65".

PLANT LEAD-IN-AIR VALUES FOR UNFORMED PLATES

| | Plate Stacking Area | | Winkel Burning Area | |
|---|---|---|---|---|
| Sample No. | Without SS-65 | With SS-65 | Without SS-65 | With SS-65 |
| 1 | .22nylm³ | .08mg/m³ | .06 | .01 |
| 2 | .15 | .08 | .08 | .01 |
| 3 | .09 | .02 | .05 | .03 |
| 4 | .10 | .03 | .04 | .03 |
| 5 | .15 | .10 | .04 | |
| 6 | .22 | .05 | | |
| 7 | .16 | .03 | | |
| 8 | .20 | .07 | | |
| 9 | .13 | .04 | | |
| 10 | .19 | | | |
| 11 | .17 | | | |
| 12 | .12 | | | |
| 13 | .06 | | | |
| Average | .151 | .053 | .054 | .02 |
| Reduction | | 65% | | 63% |

PLANT LEAD-IN-AIR VALUES FOR DRY CHARGE PLATES

| | Plate Stacking Area | | Winkel Burning Area | |
|---|---|---|---|---|
| Sample No. | Without SS-65 | With SS-65 | Without SS-65 | With SS-65 |
| 1 | .06mg/m³ | .02mg/m³ | .04mg/m³ | .004mg/m³ |
| 2 | .05 | .03 | .04 | .01 |
| 3 | .09 | .02 | .04 | .02 |
| 4 | .07 | .08 | .07 | .02 |
| 5 | | .06 | .05 | .01 |
| 6 | | | .05 | .05 |
| 7 | | | .05 | .04 |
| Average | .068 | .042 | .049 | .022 |
| Reduction | | 38% | | 55% |

Performance tests conducted with batteries having plates with sodium silicate and compared with batteries not constructed with sodium silicate also confirmed initial laboratory tests that sodium silicate at the 0.5% level in the paste mix did not significantly reduce battery performance. In fact, improvement in certain performance characteristics over the control battery performances shown. The following table provides a comparison of certain performance characteristics for wet and dry charge batteries, with or without sodium silicate in the paste mix. The figures provided are averages derived from four batteries in each category.

| Battery Plate Type | Activation | | Reserve Capacity | | Cold Cranking | |
|---|---|---|---|---|---|---|
| | Voltage at 15 sec | Mins. to Reach 6v. | Cycle No. 1 | Cycle No. 3 | Voltage at 30 sec. | Mins. to Reach 6v. |
| Sodium Silicate (Wet Charge) | — | — | 117.1 | 112.7 | 7.73 | 1.83 |
| Control (Wet Charge) | — | — | 116.5 | 109.8 | 7.76 | 1.83 |
| Sodium Silicate (Dry Charge) | 6.75 | 0.62 | 110.1 | 112.1 | 7.69 | 2.01 |
| Control (Dry Charge) | 6.86 | 0.89 | 106.5 | 108.9 | 7.77 | 1.93 |

The control batteries were constructed with plates having no sodium silicate in the paste. The sodium silicate batteries were constructed from grids pasted with a 0.5% sodium silicate paste mix. The battery activation test for the dry charge batteies was conducted at −1° C. and at a 270 Ampere discharge rate. The reserve capacity test was conducted at 27° C. and at a 25 Ampere discharge rate. The values listed are the minutes required to reduce the battery voltage to 10.5 volts after the noted number of cycles. The cold cranking test was conducted at −18° C. and with a discharge rate of 360 Amperes.

These test results show that the addition of 0.5% weight percent sodium silicate actually slightly improves battery performance in most areas. In fact the 3 cycle reserve capacity ratings for the wet charge sodium silicate and control batteries correspond to 47.0 Ampere-hours and 45.8 Ampere-hours, respectively. Similar results are shown for the dry charge batteries, wherein the 3 cycle reserve capacity rating for sodium silicate and control batteries corresponds to 46.7 Ampere-hours and 45.4 Ampere-hours, respectively. Therefor, in addition to providing better lead dust control in manufacturing batteries, the addition of sodium silicate also slightly improves battery capacity.

From these test results, it is evident that use of "SS 65" sodium silicate paste additive for lead acid batteries provides a plate which helps reduce the lead content in the air inside a manufacturing plant and also increases the ability to handle the plates without causing damage to them. In addition, completed batteries having these improved plates provide performance characteristics which are equal to or better than those in batteries which do not have a sodium silicate additive in the paste mix.

While a particular embodiment of this invention has been shown and described, it is obvious that changes and modifications can be made without departing from the true spirit and scope of the invention. It is the invention in the appended claims to cover all such changes and modifications.

The invention claimed is:

1. An improvement in a lead acid storage battery having
    negative plates comprised of a paste containing negative battery material upon a grid; and
    a positive plate comprised of a paste containing positive battery material upon a grid; wherein the improvement comprises
    at least one of the pastes containing 0.1–1.0 percent by weight sodium silicate mixed with said battery material.

2. The invention recited in claim 1, wherein the sodium silicate has a $SiO_2/Na_2O$ ratio of substantially 3.22.

3. The invention recited in claim 2, wherein the sodium silicate is in the anhydrous form.

4. The invention recited in claim 2, wherein the sodium silicate comprises substantially 0.5 weight percent of the paste mix.

5. The invention recited in claim 4, wherein the sodium silicate has a $SiO_2/Na_2O$ ratio of substantially 3.22.

6. The invention recited in claim 4, wherein the sodium silicate is in the anhydrous form.

7. The invention recited in claim 5, wherein the sodium silicate is in the anhydrous form.

* * * * *